United States Patent Office 3,554,683
Patented Jan. 12, 1971

3,554,683
POLYOLEFIN COMPOSITION EXCELLENT IN DYEABILITY
Yoshisato Fujisaki and Itsuho Aishima, Tokyo, Noboru Fukuma, Nobeoka-shi, Atsuo Nakanishi, Yokohama, and Kenichi Matsui, Tsukasa Shima, and Schiyouzi Nakai, Nobeoka-shi, Japan, assignors to Asahi Kasei Kogyo Kabushiki Kaisha, Osaka, Japan, a corporation of Japan
No Drawing. Filed June 14, 1967, Ser. No. 645,903
Claims priority, application Japan, June 18, 1966, 41/39,153; Dec. 29, 1966, 42/85,636
Int. Cl. C08f 45/66; D06p 3/02, 3/06
U.S. Cl. 8—4         16 Claims

ABSTRACT OF THE DISCLOSURE

An easily dyeable polyolefin composition, obtained by adding a compound having in its molecule a basic nitrogen atom together with a specific amount of fine-grain inorganic compounds of specific kind and a specific amount of liquid pariffin to a polyolefin and mixing the same therewith.

---

The present invention relates to a polyolefin composition excellent in dyeability.

Because polyolefins, for example, crystalline polypropylene, polybutene, poly-4-methylpentene-1 or high density polethylene do not have a polar group capable of being activated point of dye adsorption in their molecular structure, it has been very difficult to dye products thereof with deep color as well as with color fastness by ordinary methods. This has heretofore been a great hindrance which restricts the usefulness of such products.

There have been many methods proposed for improving the dyeability of such hardly dyeable polyolefins as mentioned above, wherein basic nitrogen compounds are incorporated into a polyolefin resin before shaping the composition. However, notwithstanding that these basic nitrogen compounds are readily bonded to acid dyes in an acid aqueous solution, the property of dye adsorption thereof is significantly decreased when contained in a polyolefin resin, and in some cases the basic nitrogen compound is bled out in a dye bath during the dyeing step. As a result, a dyed product which can sufficiently be put in practical use is hardly obtained.

In order to overcome these disadvantages there have been many proposals, among which are that the molecular weight of the basic nitrogen compound be adjusted, that a long chain alkyl group be introduced into the molecule, or that a dispersion agent be employed at the same time and so on. These proposals, however, have been found to be very poor in their effect, and consequently there still remain many problems to be solved because of nonuniformity of the shaped article and defects from the view point of the process steps.

A method is known in the art, wherein a low molecular weight primary, secondary or tertiary amine, or a nitrogen-containing high molecular weight substance is added to a polyolefin resin to form a shaped article and the shaped article is intended to be dyed. However, as mentioned above, this shaped article cannot be sufficiently dyed with acid dyes. Particularly, when using a low molecular weight substance as an additive, the additive is significantly bled out during the dyeing process. Further, there is a disadvantage in case such a composition as mentioned above is shaped into fibers since the dyeability of the fibers further decreases in proportion to an increase of the draw ratio.

As the result of extensive studies on methods for overcoming these defects and obtaining a dyed product with deep color, the present inventors have discovered a special polyolefin composition which can be dyed with ordinary acid dyes very readily as well as with fastness of color.

The present invention provides a polyolefin composition having improved dyeability which can be obtained by mixing (A) 1–5% by weight of at least one low molecular weight amine of the formula

wherein $R^1$, $R^2$ and $R^3$ are respectively alkyl group having 8 or more carbon atoms or derivatives thereof, or 0.5–20% by weight of at least one high molecular weight substance having in its molecule more than $1 \times 10^{-5}$ gram equivalent per gram of nitrogen atom capable of being converted into the form of ammonium ion at pH 2, (B) one or more inorganic substance selected from lithium carbonate, strontium carbonate, calcium carbonate, barium carbonate, magnesium carbonate, basic magnesium carbonate, zinc carbonate, magnesium hydroxide, zinc hydroxide, calcium silicate, magnesium oxide and zinc oxide, having an average particle size of less than 1 micron, in an amount of 1–5% by weight when (A) is the low molecular weight amine and of 0.5–20% by weight when (A) is the high molecular weight substance, with the proviso that the amount of said high molecular weight substance is more than ⅓ times the amount of (B), and (C) 1–20% by weight of liquid paraffin (all the amounts hereinbefore mentioned beng based on the weight of the composition). The polyolefin shaped articles in which (A), (B) or (C) has been singly incorporated into a polyolefin resin cannot be dyed with acid dyes. Furthermore, a polyolefin shaped article in which both (A) and (C) have been incorporated cannot be sufficiently dyed with acid dyes. Still further, notwithstanding that a polyolefin shaped article in which both (A) and (B) have been incorporated is significantly improved in dyeability with anion dyes such as acid dyes as compared with the case where (A) alone has been incorporated into the shaped article, the property of dye adsorption in the case of fiber or film thereof gradually decreases with an increase in the draw ratio for the purpose of improving physical properties. Needless to say, the shaped article in which both (B) and (C) have been incorporated at any mixing ratio cannot be dyed with acid dyes.

Despite all the above-mentioned facts, it has been surprisingly found that by incorporating (A), (B) and (C) in the above-stated mixing ratio into a polyolefin resin, the shaped article thereby obtained attains entirely unexpected significant properties, namely, that the shaped article can be strikingly dyed with anion dyes such as acid dyes and no reduction in dyeability can be observed when the draw ratio is increased in the case of fiber or film thereof, which has thus resulted in the present invention.

The usefulness of these surprising properties may be further increased by the fact that the color of the dyed product is significantly fresh. In addition thereto, there can also be obtained such advantages from the view point of shaping process that in a process for shaping a composition, the shaping temperature can be lowered as compared with the case where (C) is not incorporated into the composition, and that thermal decomposition of (A) can be avoided.

The low molecular weight amines corresponding to (A) must be tertiary amines consisting of alkyl groups having 8 or more carbon atoms or derivatives thereof. Even when an amine which does not satisfy the above condition is incorporated into a polyolefin resin together with (B) and (C), the shaped article thereby produced cannot be sufficiently dyed. The low molecular weight amines which satisfy the above-mentioned condition can be sufficiently kneaded and mixed with a polyolefin resin. Specific examples of such amines include trioctylamine, tridodecylamine, tri - (12-hydroxyoctadecyl)amine, trioleylamine, etc. Furthermore, said amine is not always limited to one amine and a mixture of two or more amines may be used if the total amount of said mixture is within the range of 1-5% by weight based on the weight of the composition. When the amount of said amine incorporated is less than 1% by weight, the deepness of color of the dyed product obtained is insufficient, and when the amount exceeds 5% by weight, the physical properties of the shaped article are deteriorated.

Furthermore, the high molecular substances corresponding to (A) are produced by means such as ordinary addition polymerization, condensation polymerization, polyaddition, ring-opening polymerization and addition condensation, which methods are already known. These high molecular weight substances, for instance, include those having in their molecules nitrogen atom in the form of primary, secondary or tertiary amine, and those having nitrogen atom in the form of heterocyclic amine, etc. And, the amount of activated amino groups in the high molecular substance must be more than $1 \times 10^{-5}$ mol/g. When the amount is less than the above-stated range, sufficient dye adsorption cannot be attained. The amount required to be added is 0.5 to 20% by weight based on the composition. When the amount is less than 0.5% by weight, sufficient dye adsorption cannot be attained, and when it exceeds 20%, this is unnecessary from the view point of dye adsorption and there may be incured disadvantages from the view point of shaping property.

The high molecular weight substances explained hereinbefore may be exemplified by the following.

The polymers of vinyl monomers having a basic nitrogen are typified by vinylpyridine, N-vinylcarbazol, N,N-diethylaminoethylmethacrylate, etc. and copolymers having at least one of these vinyl monomers as a constituent, and denaturants thereof. The homopolyamides and copolyamides such as poly-ε-caprolactam, polyhexamethylene-adipamide and polyhexamethylenesebacamide, having amino groups at the terminal of the polymer, or denaturants thereof. Polyalkyleneimines such as polyethyleneimine and polypropyleneimine and derivatives thereof. Reaction products of epichlorohydrin with amines and/or diamines. Condensation polymers such as polyamides, polyesters, polyurethanes and polycarbonates having a basic nitrogen in the main chain consisting as a constituent of one or more kinds of dicarboxylic acid, glycol or diamine selected from the group consisting of dicarboxlyic acids having a basic nitrogen atom such as isocinchomelonic acid, N-methyl-di-(carboxyethyl)amine, etc., glycols having a basic nitrogen atom such as 2,5-dimethylolpyridine, etc., and primary or secondary diamines having one or more tertiary amine groups such as sym-N-methyl-diethylenetriamine. Polymers into which a basic nitrogen atom is introduced by means of chemical denaturation of a polymer containing a thiuronium salt which is obtained by thiourea treatment of polyvinyl alcohol and of polymer containing dihydroimidazol which is obtained by ethylenediamine treatment of polymethyl-methacrylate. These high molecular substances are merely given as illustrative, and it should be understood that the present invention is not limited only to the specific high molecular weight substances having a basic nitrogen atom.

Next, it is naturally necessary that the calcium carbonate or basic magnesium carbonate corresponding to (B) must be finely pulverized to such an extent that no trouble arises in the shaping of the polyolefin resin and the physical properties of the shaped article are not deteriorated. However, if the average grain size of the fine powder is not less than 1 micron, the surprising effects of this present invention namely, those of preventing elution of (A) during the dyeing step and of improving the dyeability cannot sufficiently be exhibited. Particularly, those having an average particle size of less than 0.2 micron give good results. Further, the amount of (B) to be added for exhibiting such surprising effects varies depending upon the nature of (A). In case (A) is low molecular weight amine, the amount to be added is 1-5% by weight based on the weight of the composition, but if (A) is high molecular weight substance, 0.5-20% by weight, and in the latter case, the amount of (B) is more than ⅓ times the amount of (A). When the amount is less than the above-defined range of amount to be added, the drastic improvement in dyeability according to the present invention cannot be observed even if the other conditions are faithfully followed. In some cases, (A) is diffused out on the surface of the fibers during the dyeing process and is bled out into the dye bath. When (B) is added in accordance with the specified range, such hinderances do not occur. But, the use in an amount exceeding the range is not necessary from the view point of dyeing process, and problems are incurred in the shaping process and simultaneously mechanical properties of the shaped article obtained are deteriorated. Furthermore, the inorganic compounds corresponding to (B) may be subjected to chemical or physical surface treatment with higher fatty acid or surface active agent for the purpose of preventing coherence between fine particles and for other purposes.

The amount of liquid paraffin (C) to be mixed is 1-20% by weight based on the weight of the composition, preferably more than 5% by weight when the great reduction in the shaping temperature is taken into consideration simultaneously. From the effect of dyeing process, the use of liquid paraffin in an amount exceeding 20% by weight is not only unnecessary but it also is desirable not to exceed 20% by weight from the view point of the mechanical properties of the shaped article. The liquid paraffin used in the present invention is a colorless oily fluid obtained from petroleum, which is substantially odorless and is chemically a very inactive substance even on heating. It is insoluble in water or alcohol, but soluble in ether, chloroform, carbon bisulfied and the like.

The composition of the present invention is a polyolefin composition having improved dyeability, which consists mainly of a polyolefin, for example, such as polyethylene, polypropylene, polybutene, poly-4-methylpentene-1 or copolymers thereof or mixtures thereof. The major characteristic thereof is that the composition can be shaped into fibers, films, sheets, or tubes which can readily and freshly be dyed with common anion dyes, i.e. acid dyes, direct dyes, acid mordant dyes, reactive dyes and the like. Further, the polyolefin composition of the present invention is also characterized by the fact that it does not impart any adverse effect on the effectiveness of light stabilizers, fluorescent whitening agents or the like, and at the same time the dyed products of the shaped articles as mentioned above have excellent fastness of color.

The present invention is explained in more detail in the following examples, which are given merely as illustrative but not as limiting.

EXAMPLE 1

Six parts of trioctylamine and 6 parts of precipitated calcium carbonate having an average particle size of 0.05 micron were added to 88 parts of crystalline polypropylene having an intrinsic viscosity of 1.3 as measured in a tetralin solution at 135° C., and the mixture was kneaded with a Banbury Mixer to obtain a resin A. Separately, 20 parts of liquid paraffin were added to 80 parts of the same crystalline polypropylene as above, and the mixture was kneaded with a Banbury Mixer to obtain a resin B. Equivalent weights of the resins A and B were mixed together, then the mixture was extrusion-shaped at 150° C. to obtain a resin in pellet form (colorless pellet being nearly transparent), each having an average grain size of about 3 mm. The pellets were extruded at 200° C. and then drawn to 4 times the original length at room temperature to obtain a multifilament of 50 d./16 filaments. The filament showed tenacity of 4.5 g./d., elongation of 30% and thermal shrinkage of 15% at 130° C.

20 g. of the filament were dyed in 1 l. of acid solution containing 4 g. of acid with 0.6 g. of C.I. Acid Orange 7, 15510, at 100° C. for 60 minutes to obtain a very fresh deep orange dyeing. The light fasteness of the dyeing was of the 5th grade.

EXAMPLE 2

Forty parts of crystalline polypropylene having an intrinsic viscosity of 1.8 as measured in a tetralin solution at 135° C. and 60 parts of basic magnesium carbonate having an average particle size of less than 0.1 micron were kneaded and mixed together with a Banbury Mixer to obtain a resin A cut in pellet form. Separately, 80 parts of the same crystalline polypropylene as above and 20 parts of liquid paraffin were kneaded and mixed together with a Banbury Mixer to obtain a resin B cut into pellet form. Then, 42 parts of the same crystalline polypropylene as above, 5 parts of the resin A, 50 parts of the resin B and 3 parts of trioctadecylamine were mixed together, and the mixture was extrusion-shaped at 160° C. to obtain a resin in pellet form, each having an average grain size of about 3 mm. The pellets were extruded at 200° C. and then drawn to 4 times the original length at room temperature to obtain a multifilament of 50 d./16 filaments. The filament had a tenacity of 4.3 g./d., elongation of 35% and thermal shrinkage of 13% at 130° C.

20 g. of the filament were dyed in 1 l. of acid solution containing 10 g. of glacial acetic acid with 0.6 g. of C.I. Acid Blue 80, 61585, at 100° C. for 60 minutes to obtain a very fresh deep blue dyeing. The light fastness of the dyeing was of the 4th grade.

EXAMPLE 3

In Example 2, 5 parts of the resin A, 5 parts of the resin B, 3 parts of trioctadecylamine and 87 parts of crystalline polypropylene were mixed together and the mixture was extruded at 200° C. to obtain a resin in pellet form, each having an average grain size of about 3 mm. The pellets were extruded at 230° C. to obtain undrawn yarn of 200 d./16 filaments, which was drawn to 3 times the original length at ordinary temperature and was dyed under the same conditions as in Example 2. As a result, a deep blue dyeing was obtained. However, the yarn drawn at 5 times the original length was only dyed to an extent of medium color.

EXAMPLE 4

Ten parts of a 40/60 (weight ratio) copolymer of N,N-diethylaminoethylmethacrylate/methyl methacrylate, 5 parts of precipitated calcium carbonate having an average particle size of 0.1 micron and 10 parts of liquid paraffin were added to 85 parts of low pressure method polyethylene (vicometric average molecular weight: about 180,000) and the mixture was melted and mixed to obtain pellets. The pellets were melt-spun at 220° C. to obtain fibers of monofilament of about 50 denier. 20 g. of the fibers was dyed in 1 l. of acid solution conttaining 5 g. of salicylic acid with 0.6 g. of C.I. Acid Blue 59, 50315, at 100° C. for 90 minutes to obtain a fresh blue dyeing. The dye exhaustion was more than 98%.

On the other hand, in the case where the amount of the precipitated calcium carbonate added was reduced to 0.5 part, the dye exhaustion was less than 60%, and when the surface of the dyed fiber was observed with microscope, there were observed colored materials being scatteredly and convexly adhered thereto.

EXAMPLE 5

To 92 parts of crystalline polypropylene (viscometric average molecular weight: about 130,000), were added 5 parts of polyalkyleneimine resin obtained by 1/1 mol reaction of epichlorohydrin with laurylamine in the presence of sodium hydroxide, 3 parts of Hakuenka CCR (produced by Shiraishi Kogyo K.K.: 95% of calcium carbonate, absolute specific gravity being 2.52, average particle size being 0.08 micron) and 10 parts of liquid paraffin. The mixture was melted and mixed at 230° C. to obtain pellets. The pellets were melt-spun at 260° C. and drawn to 3 times the original length to obtain fibers of monofilament of about 7 d. 20 g. of the fibers were dyed in 1 l. of acid solution containing 10 g. of acetic acid with 0.6 g. of C.I. Acid Yellow 117, 24820, at 100° C. for 90 minutes to obtain a deep yellow dyeing. The dye exhaustion was more than 98%.

On the other hand, the dye exhaustion of the fiber to which Hakuenka had not been added was less than 80%, and there were observed a large amount of yellowish tacky materials being adhered onto the surface of the dyed fibers.

EXAMPLE 6

To 80 parts of crystalline polypropylene (viscometric average molecular weight: about 130,000), were added 10 parts of a copolyamide (number of amino group at the therminal: $4.5 \times 10^{-5}$ equivalent/g.) obtained by the reaction of ε-caprolactam/hexamethyleneadipamide (60/40) by weight ratio), 5 parts of calcium silicate having an average particle size of less than 0.1 micron and 5 parts of liquid paraffin, and the mixture was melted and mixed at 230° C. to obtain pellets. These pellets were melt-spun at 260° C. to obtain fibers of about 7 d./filament. 20 g. of the fibers were dyed in 1 l. of an acid solution containing 10 g. of acetic acid with 0.6 g. of C.I. Acid Orange 7, 15510, at 100° C. for 90 minutes to obtain a very fresh orange dyeing.

On the other hand, in the case where the basic magnesium carbonate was not added, the fibers obtained were dyed only to the extent of a stain.

What is claimed is:

1. A polyolefin composition having improved dyeability which is obtained by mixing a polyolefin resin with (A) 1–5% by weight of at least one low molecular weight amine of the formula:

wherein $R^1$, $R^2$ and $R^3$ are respectively alkyl group having 8 or more carbon atoms or derivatives thereof, or 0.5–20% by weight of at least one high molecular weight substance having in its molecule more than $1 \times 10^{-5}$ gram equivalent per gram of nitrogen atom capable of being converted into the form of ammonium ion at pH 2, (B) an inorganic substance which is calcium carbonate having an average particle size of less than 1 micron, in an amount of 1–5% by weight when (A) is a low molecular weight amine, or 0.5–20% by weight when (A) is a high molecular weight substance, provided that the weight of said high molecular weight substance is more than ⅓ times the amount of (B), and (C) 1–20% by weight of liquid paraffin, all amounts hereinbefore mentioned being based on the weight of the composition.

2. A composition according to claim 1, wherein the polyolefin is polyethylene, polypropylene, polybutene, poly-4-methylpentene-1 a copolymer thereof or a mixture thereof.

3. A composition according to claim 1, wherein the low molecular weight amine of the formula:

is trioctylamine, tridodecylamine, trioctadecylamine, tri-(12-hydroxyoctadecyl)amine, or trioleylamine.

4. A composition according to claim 1, wherein the high molecular weight substances are polymers obtained from vinylpyridine, N-vinylcarbazol and N,N'-diethylaminoethylmethacrylate, and copolymers containing at least one of said high molecular weight substances as a constituent unit.

5. A composition according to claim 1, wherein the high molecular weight substance is poly-ε-caprolactam, polyhexamethyleneadipamide, polyhexamethylenesebacamide or a copolyamide thereof, having a terminal amino group.

6. A composition according to claim 1, wherein the high molecular weight substance is a polyalkyleneimine which is polyethyleneimine, polypropyleneimine, or a derivative thereof.

7. A composition according to claim 1, wherein the high molecular weight substance is reaction products of epichlorohydrine with amines and/or diamines.

8. A composition according to claim 1, wherein the high molecular weight substance is a polyamide, polyester, polyurethan or polycarbonate which contains as a constituent unit, isocinchomelonic acid, N-methyldi(carboxyethyl)amine, 2,5-di-methylolpyridine or sym-N-methyldiethylenetriamine.

9. A composition according to claim 1, wherein the high molecular weight substance is a polymer containing a strontium salt obtained by thiourea treatment of polyvinyl alcohol.

10. A composition according to claim 1, wherein the high molecular weight substance is a polymer containing dihydroimidazol obtained by ethylenediamine treatment of polymethylmethacrylate.

11. A composition according to claim 1, wherein the calcium carbonate has an average particle size of less than 0.2 micron.

12. A composition according to claim 1, wherein the calcium carbonate has an average particle size of 0.05 micron and same is coated with a higher fatty acid.

13. A composition according to claim 1, wherein the surface of the calcium carbonate has been treated with a light stabilizer, a thermal stabilizer or a fluorescent whitening agent.

14. A composition according to claim 1, further comprising a light stabilizer, a thermal stabilizer, a fluorescent whitening agent and a delustering agent.

15. A fiber, film, sheet or tube shaped from the composition as claimed in claim 1.

16. A method of dyeing the shaped articles claimed in claim 15 comprising using an acid bath with anion dyes.

References Cited

UNITED STATES PATENTS

| | | | |
|---|---|---|---|
| 3,098,692 | 7/1963 | Gagliardi | 8—55 |
| 3,322,704 | 5/1967 | Berger et al. | 260—33.6P.O. |
| 3,331,806 | 7/1967 | Fior et al. | 260—41 |
| 3,361,843 | 1/1968 | Miller | 8—180 |

FOREIGN PATENTS

| | | | |
|---|---|---|---|
| 584,620 | 1/1947 | Great Britain | 260—41B |

MORRIS LIEBMAN, Primary Examiner

J. H. DERRINGTON, Assistant Examiner

U.S. Cl. X.R.

8—166, 168, 180; 260—23, 33.6, 41, 857, 873, 895, 896, 897; 264—78

UNITED STATES PATENT OFFICE
CERTIFICATE OF CORRECTION

Patent No. 3,554,683                     Dated January 12, 1970

Inventor(s) Yoshisato Fujisaki et al.

It is certified that error appears in the above-identified patent and that said Letters Patent are hereby corrected as shown below:

In the heading to the printed specification, lines 6 and "Schiyouzi Nakai" should read -- Chiyouzi Nakai --.

Signed and sealed this 22nd day of February 1972.

(SEAL)
Attest:

EDWARD M. FLETCHER, JR.                  ROBERT GOTTSCHALK
Attesting Officer                        Commissioner of Patent